(12) United States Patent
Harbusch et al.

(10) Patent No.: US 11,152,635 B2
(45) Date of Patent: Oct. 19, 2021

(54) METHOD AND DEVICE FOR PARALLEL CONDENSATION AND EVAPORATION FOR FUEL CELL SYSTEM

(71) Applicant: Siqens GmbH, Munich (DE)

(72) Inventors: Volker Harbusch, Munich (DE); Jürgen Krelle, Munich (DE)

(73) Assignee: Siqens GmbH, Munich (DE)

( * ) Notice: Subject to any disclaimer, the term of this patent is extended or adjusted under 35 U.S.C. 154(b) by 684 days.

(21) Appl. No.: 15/756,735

(22) PCT Filed: Sep. 1, 2016

(86) PCT No.: PCT/EP2016/070655
§ 371 (c)(1),
(2) Date: Apr. 23, 2018

(87) PCT Pub. No.: WO2017/037197
PCT Pub. Date: Mar. 9, 2017

(65) Prior Publication Data
US 2018/0241060 A1 Aug. 23, 2018

(30) Foreign Application Priority Data
Sep. 1, 2015 (DE) ...................... 10 2015 114 613.4

(51) Int. Cl.
*H01M 8/1011* (2016.01)
*H01M 8/1007* (2016.01)
(Continued)

(52) U.S. Cl.
CPC ..... *H01M 8/1011* (2013.01); *H01M 8/04164* (2013.01); *H01M 8/04843* (2013.01);
(Continued)

(58) Field of Classification Search
CPC .................................................. H01M 8/1011
See application file for complete search history.

(56) References Cited

U.S. PATENT DOCUMENTS 4,530,886 A * 7/1985 Sederquist .............. H01M 8/04
429/414
6,468,683 B1 10/2002 Menzer et al.
(Continued)

FOREIGN PATENT DOCUMENTS

CA 2259195 A1 12/1997
CN 104577168 A 4/2015
(Continued)

OTHER PUBLICATIONS

German Search Report, dated Jun. 15, 2016, from German Application No. 10 2015 114 613.4, filed on Sep. 1, 2015. 10 pages.
(Continued)

*Primary Examiner* — Brian R Ohara
(74) *Attorney, Agent, or Firm* — HoustonHogle LLP

(57) ABSTRACT

According to the invention, a method for parallel condensation and evaporation is provided for a fuel cell system with a condensation/evaporation device. In this case, the condensation-evaporation device (KVV) has a condensation chamber and an evaporation chamber, which are thermally coupled to one another via a heat exchanger so that water vapor contained in the condensation chamber in exhaust gas of a fuel cell stack is condensed into water and in the evaporation chamber a liquid fuel of a two-phase mixture comprising the liquid fuel and a gas phase, are at least partially vaporized to fuel vapor. In this case, the energy required for evaporation is at least partially provided by waste heat from an exhaust gas of a fuel cell stack of a fuel cell and the associated energy withdrawal from the exhaust gas of a fuel cell stack is used for condensation. The present invention is characterized in that the gas phase comprises a carrier gas which is $CO_2$.

10 Claims, 3 Drawing Sheets

Figure 1:
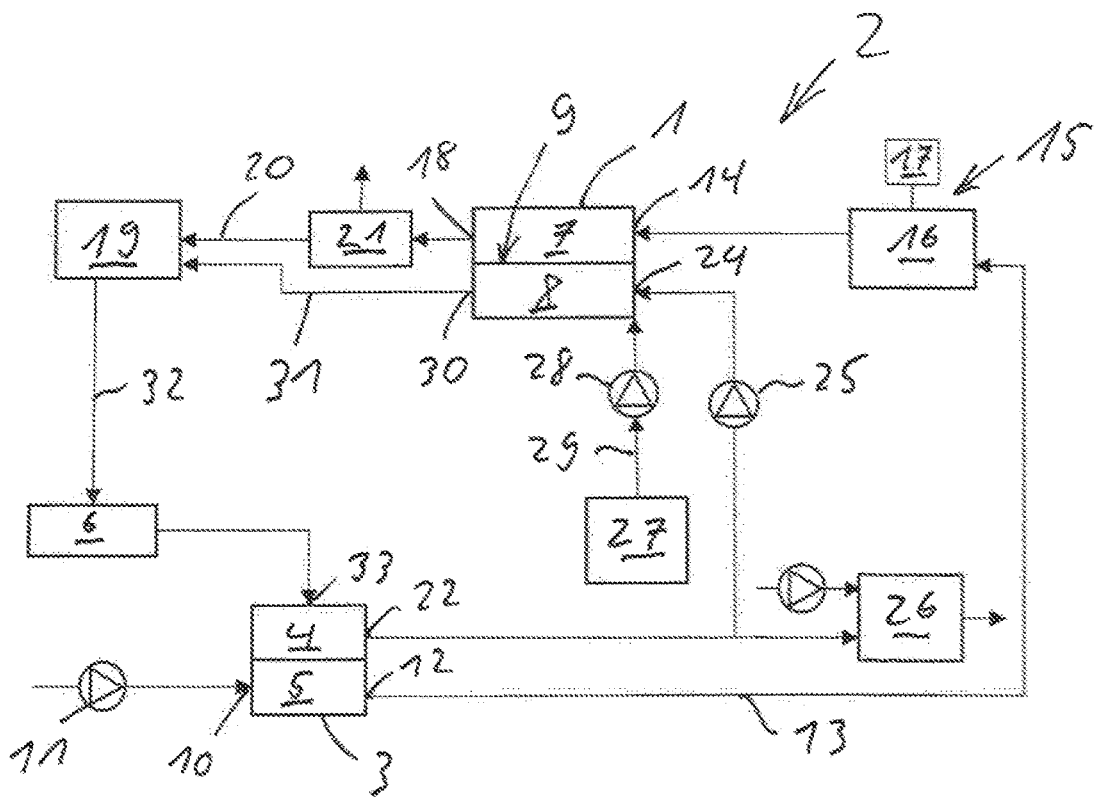

(51) Int. Cl.
*H01M 8/04119* (2016.01)
*H01M 8/04828* (2016.01)
*H01M 8/0606* (2016.01)
*H01M 8/04007* (2016.01)
*H01M 8/0612* (2016.01)

(52) U.S. Cl.
CPC ....... *H01M 8/0606* (2013.01); *H01M 8/1007* (2016.02); *H01M 8/04007* (2013.01); *H01M 8/0618* (2013.01); *Y02E 60/50* (2013.01)

(56) References Cited

U.S. PATENT DOCUMENTS

| | | | |
|---|---|---|---|
| 6,696,188 B1 | 2/2004 | Boneberg et al. | |
| 2002/0119352 A1 | 8/2002 | Baldauf et al. | |
| 2004/0166389 A1* | 8/2004 | Matsuoka | H01M 8/1011 429/415 |
| 2011/0294024 A1* | 12/2011 | Harbusch | H01M 8/04197 429/413 |

FOREIGN PATENT DOCUMENTS

| | | |
|---|---|---|
| DE | 19802038 A1 | 7/1999 |
| DE | 19903168 A1 | 8/2000 |
| DE | 19945715 A1 | 4/2001 |
| DE | 102008061771 A1 | 6/2010 |
| EP | 2164123 A1 | 3/2010 |
| WO | 9750140 A1 | 12/1997 |
| WO | WO 2015110545 | 7/2015 |

OTHER PUBLICATIONS

International Search Report of the International Searching Authority, dated Dec. 1, 2016, from International Application No. PCT/EP2016/070655, filed on Sep. 1, 2016. 5 pages.

Written Opinion of the International Searching Authority, dated Dec. 1, 2016, from International Application No. PCT/EP2016/070655, filed on Sep. 1, 2016. 5 pages.

International Preliminary Report on Patentability, dated Mar. 15, 2018, from International Application No. PCT/EP2016/070655, filed on Sep. 1, 2016. 14 pages.

Chinese Second Office Action dated Mar. 17, 2021 for Chinese Patent Application No. 201680062451.5. 14 pages.

* cited by examiner

METHOD AND DEVICE FOR PARALLEL CONDENSATION AND EVAPORATION FOR FUEL CELL SYSTEM

RELATED APPLICATIONS

This application is a § 371 National Phase Application of International Application No. PCT/EP2016/070655, filed on Sep. 1, 2016, now International Publication No. WO 2017/037197, published on Mar. 9, 2017, which International Application claims priority to German Application 10 2015 114 613.4, filed on Sep. 1, 2015, both of which are incorporated herein by reference in their entirety.

The present invention relates to a method and a device for parallel condensation and evaporation for a fuel cell system with a condensation/evaporation device as well as a fuel cell system with such a condensation/evaporation device.

EP 2 164 123 A1 shows a moistening module in which the cathode air is pre-moistened with water vapor provided from the cathode exhaust gas before it enters the cathode of a fuel cell. For transmitting the water vapor from the cathode exhaust gas to the cathode air, a transmission device is provided. This is designed as a water-permeable capillary tube bundle.

DE 10 2008 061 771 A1 discloses a fuel cell unit for gaseous fuels, in which case a moistening device is used and CO2 is circulated as a carrier gas.

DE 199 03 168 C2 discloses a spiral heat exchanger which is intended to be used for evaporating media in a fuel cell system. In this case, it is provided to supply an anode and a cathode exhaust gas to an exhaust aftertreatment stage. In the exhaust after-treatment stage, the combustible constituents of the anode exhaust gas are oxidized with the oxygen and the cathode exhaust gas with the aid of a suitable catalyst. By the oxidation in the exhaust aftertreatment stage, the exhaust gas is to be supplied with thermal energy. The exhaust gas is then fed to the heat exchanger in such a way that it flows through it in the axial direction and is subsequently discharged to the surrounding environment. A medium to be evaporated, i.e. water and/or methanol is fed to the heat exchanger and flows through the same. Thereafter, it is supplied to a gas generating stage in gaseous form. Thus, the spiral heat exchanger serves simultaneously as a gas-heated evaporator and as an exhaust gas cooler for the fuel cell system. A first fluid (exhaust gas) is thus fully reacted in the exhaust after-treatment stage and then passed through chambers of the heat exchanger. As a second fluid, the liquid reactants for the gas generating stage are passed through chambers of the heat exchanger and vaporized by the heat exchange with the chambers.

DE 199 45 715 A1 discloses a direct methanol fuel cell system as well as a corresponding method for operating the same. This system comprises a mixing device for providing a fuel mixture, which is subsequently fed to an evaporator and from there into the anode gas chambers of a fuel cell stack. In this case, the waste heat of the spent oxidant for the evaporation of the unused fuel should be used in the evaporator. Here, the evaporation temperature is lower than the one of the fuel cell exhaust gas. The evaporation temperature depends on the stoichiometry of the methanol-water mixture and should for example be below 100° C. Product water is condensed out of the cathode exhaust gas in the evaporator, which is then separated from the gaseous phase in a water separator. A corresponding gas phase is freed of undesirable emissions via a gas purification plant. The liquid phase is then fed to a water tank (to provide a methanol solution in conjunction with a methanol tank).

The object of the present invention is to provide a method and an apparatus for efficient water recovery, and for the energy-efficient evaporation of fuel for a fuel cell system.

The object is solved by the subject matter of the independent claims. Preferred embodiments of the invention are the subject of the dependent claims.

According to the invention, a method for parallel condensation and evaporation for a fuel cell system with a condensation/evaporation device is provided, wherein the condensation evaporation device (KVV) has a condensation chamber and an evaporation chamber, which are thermally coupled to one another via a heat exchange device in such a way that in the condensation chamber water vapor contained in an exhaust gas of a fuel cell stack is condensed into water, and in the evaporation chamber, a liquid fuel of a two-phase mixture comprising the liquid fuel and a gas phase is at least partially vaporized into fuel vapor. Here, the energy required for evaporation is at least partially provided by waste heat from an exhaust gas of a fuel cell stack of a fuel cell and the associated energy withdrawal from the exhaust gas of a fuel cell stack for condensation is used. The present invention is characterized in that the gas phase comprises a carrier gas which is $CO_2$.

For a sufficient process water supply of the fuel cell system by means of the gaseous water contained in the cathode exhaust gas, this must be cooled down accordingly.

To ensure a sufficient supply of oxygen to the fuel cell stack, this one is usually operated with an oxygen excess of 100%, which corresponds to a cathode lambda of about two.

If this oxygen supply is provided by ambient air, the dew point is approx. 60° C., above which no water condenses. The reforming of methanol and water to hydrogen and carbon dioxide is operated with an excess of water of 30% (Steam to Carbon Ratio (S/C) 1.3), otherwise the carbon monoxide portion of the reaction becomes too large.

For this reason, the cathode exhaust gas must be cooled below about 49° C. to close the water balance.

To be able to condense enough water at high temperatures up to about 50° C., a heat exchanger apparatus can be used. In this case, cathode exhaust gas is passed through its condensation chamber, and methanol together with the carrier gas comprising $CO_2$ through its evaporation chamber.

For the evaporation of the methanol in the carrier gas, evaporation energy is needed, which is withdrawn from the cathode exhaust, and this cools below the dew point. By a corresponding ratio of carrier gas ($CO_2$) to methanol, the cathode exhaust gas according to the invention can be cooled independently of the ambient temperature so that sufficient water is condensed out to close the water balance.

If only one methanol mixture of water was conducted through the evaporation chamber without the inert carrier gas $CO_2$, as is provided according to DE 199 45 715 A1, the boiling point of the fuel would be available as the lowest temperature level. This is in pure methanol under standard pressure at about 65° C. If one passes a methanol/water mixture with a S/C (steam to carbon ratio) of 1.3 through the evaporation chamber, the boiling point is about 74.5° C., Thus, a water recovery from the cathode exhaust gas without an inert carrier gas is not possible because the boiling point of the fuel or the fuel mixture is too high and thus a condensation is not possible.

As a result of the fact that, according to the invention, an inert carrier gas, namely $CO_2$, is provided, a water recovery from the cathode exhaust gas is possible because the boiling point of the fuel or the fuel mixture is low enough to condense water.

With the present invention, it is possible for the first time to operate a fuel cell system even in hot areas in which the temperatures necessary for adequate water recovery of the fuel cell exhaust gas cannot be achieved by a single air cooling or are not economical or require heat exchangers that are too large. With the present condensing chamber, and the condensation occurring therein, product water required for operation can be obtained even at high outside temperatures.

The advantage of a water recovery is that in the fuel cell system during operation no extra water nor diluted fuel must be supplied, since the water is recovered in the KVV and therefore is available for further operation. This also significantly reduces the requirements for the infrastructure. In relation to diluted fuels, the undiluted fuel has a higher energy content, which saves transportation weight and fuel costs.

The KVV can also be used for high-performance fuel cell systems.

Furthermore, the KVV is extremely cost-effective, reliable in operation and low maintenance.

The KVV or its heat exchanger apparatus is considerably smaller than the necessary heat exchangers in purely air-cooled systems. This reduces the installation space, the weight of the system and the transport costs. The heat exchanger apparatus has a small installation space, since a sufficient temperature difference can be set or set by the evaporation of the fuel on a cooling side of the condensation space. In this case, the cooling side is adjacent to the heat exchanger apparatus wall and thus adjacent to the evaporation space wall of the condensation space. That temperature difference is higher than when air is cooled at high outside temperatures. In addition, heat is not only delivered to a gas phase but also to a liquid. This results in a better heat transfer at the heat exchange surface. Thus, substantially smaller areas of heat exchangers are required than when cooled with air.

The condensation chamber and the evaporation chamber of the KVV can preferably be operated in countercurrent, i. e. the corresponding media are supplied to the condensation chamber and the evaporation chamber in such a way that an operation of the KVV takes place in countercurrent.

For the purposes of the present invention, fuel cell systems for which the present invention is suitable are fuel cell systems which, for example, use a reformer. In this case, the reformer reaction results in the products H2 and CO2 from liquid fuel. Such systems are, for example, high-temperature or low-temperature polymer electrolyte membrane fuel cells (HT-PEM or NT-PEM).

Furthermore, these fuel cell systems are understood as systems in which the fuel, for example, is introduced directly into the anode compartment and reacts on the anode catalyst to form $CO_2$. Such systems are, for example, direct methanol fuel cells (DMFC) or high-temperature fuel cells (SOFC) as well as all other fuel cells in which fuel must be evaporated.

Thus, the method according to the invention and a device according to the invention are suitable for fuel cell systems in which a gaseous circuit is provided for supplying the fuel cell or a reformer, in which at least part of the gas is $CO_2$. In these systems, it is envisaged to convert fuels that are liquid at ambient temperature and pressure system into the gas phase. This is based on ambient pressure or slight overpressure in the system, for example in the case of methanol, ethanol, diesel, gasoline or higher pressures, for example in the case of fuels such as liquefied petroleum gas or dimethyl ether. In addition to a gas supplied DMFC, the method can also be used for DMFC systems which are operated with liquid methanol solution. It is then provided with anode exhaust gas ($CO_2$) of the fuel cell stack to form a gas circulation for the condensation chamber.

The carrier gas can be circulated in the fuel cell system.

The gas phase can also contain hydrogen, carbon monoxide, steam, reformate or intermediate products of the reforming, fuel vapor or air. The exhaust gas from which the water is condensed out can be a cathode and/or an anode exhaust gas and preferably a cathode exhaust gas of a fuel cell stack.

Exhaust gas may also be understood to mean a mixture of cathode and anode exhaust gas. In exceptional cases, the method can also be used to dry another moist gas, for example. Anode feed gas, which is provided for supplying the anode side of a fuel cell stack, by means of the method according to the invention.

According to the invention it is thus provided, on the one hand, to use the waste heat of the cathode and/or anode exhaust gas of a fuel cell stack to liquids such as a liquid fuel, water or a fuel solution to evaporate or condensate. In this way, the cathode or anode gas of the fuel cell is deprived of energy by means of a heat exchange device or cooled, to condense water from the water vapor contained therein.

Thus, according to the invention, provision is made, particularly, for transferring heat from the exhaust gas of a fuel stack to a fuel in liquid phase and a gas phase, whereby fuel means not only pure fuel but also an aqueous fuel solution, such as methanol solution, and the gas phase is preferably $CO_2$.

This gas phase is referred to below as the carrier gas. The carrier gases may also be oxygen-depleted air, nitrogen or other inert gases.

In the evaporation chamber, the liquid fuel of the two-phase mixture is at least partially evaporated to fuel vapor. At least partially, in the context of the present invention, an evaporation of from about 10% to about 60% is understood.

In the evaporation chamber, the carrier gas can be brought into contact with liquid fuel such that a, preferably almost complete, saturation of the carrier gas with fuel vapor is achieved.

The device according to the invention used for carrying out the method is a condensation/evaporation device for a fuel cell system comprising a condensation chamber for condensing water from water vapor from an exhaust gas of a fuel cell stack and an evaporation chamber for at least partially vaporizing a liquid fuel to fuel vapor, wherein the condensation chamber and the evaporation chamber are thermally coupled via a heat exchanger apparatus so that the energy required for evaporation is at least partially provided by waste heat from a moist exhaust gas of a fuel cell stack and condensed water is removed by the associated energy withdrawal from the exhaust gas.

Thus, the evaporation of fuel, which is the enrichment of fuel and/or water, is used in the $CO_2$-phase, since in this case evaporation energy is required to extract heat energy from the exhaust gas in the thermally coupled condensation chamber. This leads to a lowering of the exhaust gas temperature. As soon as the saturation point is reached, the water contained in the exhaust gas condenses. Thus, a two-phase mixture is then also present in the condensation chamber.

The liquid phases of the two fluids in the evaporation and condensation chamber can move in direct current. The corresponding gas phases of the two fluids (exhaust gas and carrier gas) are optimally conducted in countercurrent.

The heat exchanger apparatus is designed in such a way that a quick compensation of the temperature levels of the condensation chamber and the evaporation chamber is achieved. The heat flows should be directed as efficiently as possible from the condensation room into the evaporation room.

The heat exchanger apparatus can be designed as a plate heat transfer device, wherein the plates of the plate heat exchanger are designed in such a way that a faster compensation of the temperature level of the condensation chamber and the evaporation chamber is possible to efficiently form the heat flows from the condensation chamber in the evaporation chamber.

In a plate heat transfer device this may comprise wavy profiled plates, which are composed such that in each successive chamber once the medium to be heated flows and then the heat-emitting medium (alternating). This plate pack is sealed to the outside and between the media. The plate package can be insulated to the outside.

In case that the heat exchanger apparatus is designed as a plate heat transfer device, the condensation chamber and the evaporation chamber comprise at least two and particularly, a plurality of chambers, which are arranged correspondingly alternately.

By the contact of the liquid portion of the fuel mixture with carrier gas (e. g, $CO_2$) in the evaporation chamber, the steam ideally accumulates to saturation in the $CO_2$ phase. Furthermore, it can be provided that the vaporization space or the vaporization chambers are partially filled with fuel. The carrier gas may then be bubbled through the liquid fuel at least one location or locations by a carrier gas supply means. The supply of carrier gas and fuel in the evaporation chamber is advantageously carried out in DC.

Alternatively or additionally, it may also be provided to introduce the carrier gas into the evaporation chamber or the evaporation chambers by means of the carrier gas feed device. In that case the liquid fuel is then applied in countercurrent to the walls of the evaporation spaces or the evaporation chambers of the heat transfer device, particularly on the vertically arranged plates of the plate heat transfer device such that it runs down on this and evaporates with $CO_2$ flowing in countercurrent The energy needed for complete evaporation can for example be provided by the thermal energy contained in the cathode exhaust gas before it flows into a pre-cooler and/or in the condensation-evaporation device.

The evaporation chamber can open into a further chamber for overheating, which is thermally isolated from the evaporation chamber or the condensation chamber or not thermally coupled with this or only slightly, wherein in this chamber a further energy input takes place such that the fuel completely is evaporated.

The thermal coupling or the thermal resistance should be such that no or only an insignificant energy input into the condensation chamber takes place and the cooling effect is only insignificantly reduced by the evaporation of the fuel.

Thus, according to an alternative embodiment, the evaporation chamber is expanded, for example with the additional chamber for overheating, to an overheating device in which the remaining non-evaporated liquid fuel or the fuel solution is heated above the boiling point so that it evaporates.

Water can be supplied to the other room, which is also preferably completely evaporated in the room.

Accordingly, not only is the fuel not evaporated into the $CO_2$ phase but also water is evaporated.

The chamber may be heated by heat sources to allow a pure gas supply of the reformer or fuel cell with the reactants.

Heat sources may be exhaust gases, e.g. an anode exhaust gas burner (e.g., catalytic burner), exhaust gases of the fuel cell stack, e.g. the thermal energy contained in the cathode exhaust gas, or a burner which is fueled.

To prevent condensation in the associated lines, the temperature level in this downstream room can even be raised above the temperature necessary to reach the boiling point.

If there is no overheating, the fuel-enriched carrier gas is supplied from the evaporation chamber of the CTU, optionally with unevaporated liquid fuel, an evaporator or a humidifier. These are referred to below as the media unit.

A moistening device is understood to be a device, as described, for example, in the international patent application WO 2015/110545, in which an aqueous fuel solution, such as a methanol solution, for example, is obtained and is heated to evaporate water or non-evaporated fuel into the carrier gas. The evaporation takes place e.g. by bubbling the carrier gas through a fuel solution and adjusting the vapor pressures of the solution in the gas phase by good contact between gas and liquid phases. Here, the temperature of the humidifier is below the boiling point of the fuel solution.

An evaporator is understood to be a device in which the carrier gas and the fuel as well as the supplied water or fuel solution are heated to or above the boiling point for vaporization and completely evaporate.

In both systems the vaporization energy is provided to be taken completely or partially from the exhaust gases of the fuel cell, e.g. the exhaust gas of an exhaust after-treatment burner.

For supplying gaseous DMFC systems or other fuel cell systems, such as HT-PEM or phosphoric acid fuel cells (PAFC), where humidifiers are applied, a carrier gas is contacted with mostly unconverted fuel and water vapor with a fuel solution, so that under some circumstances, a portion of the steam can go back into the liquid phase. The remaining portion of the fuel remains in the gas stream which is taken from the media unit and fed to the reformer room or anode compartment of the fuel cell system.

In this system, the supply of the amount of fuel in the evaporation chamber is adjusted so that sufficient fuel can be evaporated for the required amount of hydrogen (in the evaporation chamber and possibly in the humidifier). The adjustment of the supply amount also includes the fuel concentration in the humidifier, for example by means of a control device. Besides, the temperature in the fuel solution of the humidifier is suitably adjusted e.g. set to 55-85° C.

In this case, the supply of the reformer or of the fuel cell stack can take place such that, based on the set temperature in the humidifier and the carrier gas volume flow, the concentration and the amount of hydrogen in the reformate gas is sufficient for the respective operating point of the fuel cell is sufficient or is adapted to this.

Ideally, it is provided for the method or the device according to the invention that the temperatures in the condensation chamber and in the evaporation chamber adapt. Thus, it is provided that the exhaust gas, particularly the cathode exhaust gas, continuously releases waste heat from the condensation chamber to the evaporation chamber. To realize this, a heat exchanger, which is flowed through by both media in countercurrent, is preferred.

To adjust the temperature in such a way that the amount of water required for the reformer or anode reaction is condensed out in the condensation-evaporation apparatus, a control device may be provided which is adapted to the following parameters such as:

temperature (temperatures of the two fluids before and after the KVV, between pre-cooling stages), and/or Volume flow (carrier gas flow, condensate amount, amount of un-vaporized fuel), and/or detecting filling levels of liquids (for example, the phase separation after the condensation chamber of the KVV or the level in the media unit (humidifier or in the methanol solution container) by means of corresponding sensors and to control the components of the device according to the invention. Values which result due to the system behavior or due to the actuation of actuators such as fans or pumps are determined and with the aid of these values the condensation amount from the exhaust gas or the evaporation of the fuel is controlled by the control device. This is done by adjusting actuators such as: pumps (carrier gas pump, cathode pump), or fans (e.g., for pre-cooling or fuel cell temperature). The control device can be designed in such a way that the pre-cooling or the pre-cooling device is controlled in such a way that one or approximately the amount of water which is required for the operation of the device according to the invention is condensed in the condensation device.

The invention enables leakage of the fluids from the KVV regardless of the ambient temperature. This property can be advantageously used to temper components or fluids at a stable temperature level. For example, the pump delivering the carrier gas can be stably operated by cooling the carrier gas to a predetermined temperature level by means of a heat exchanger. This occurs when, on a cold side of a heat exchanger, the fuel cell exhaust gas flows out of the KW after phase separation and the carrier gas flows in counter-current on a hot side of the heat exchanger.

It may also be advantageous, as described, to heat the exhaust gas after the condensate has been separated before it exits the system, or to mix it with warm air to prevent icing of the exhaust gas outlet in the case of low ambient temperatures.

In order to cool the exhaust gases of the fuel cell stack before they enter the condensation chamber, a possibly multi-stage pre-cooling can take place.

For example, a first precooling of the cathode exhaust gas may be made by thermal contact with the fuel solution (e.g., methanol solution) which is in the media unit or in a methanol solution tank. The thermal contact with the fuel solution contained in the media unit may be made by means of a heat exchanger through which exhaust gas flows in the media unit (piping or plate heat exchanger means).

A second pre-cooling can be done by thermal contact with ambient air. Here, it is provided by means of a heat exchanger, e.g. a plate heat exchanger or corresponding piping with cooling fins and an air cooling (for example, an aeration system, which flows the cooling fins with cooling air) to pre-cool the exhaust gas. In the temperature range in which the pre-cooling works with ambient air, e.g. a pre-cooling of the exhaust gas to 60° C., cooling with ambient air due to a temperature difference of cooling air and exhaust gas can be made efficiently.

Another possibility is the division of the methanol pre-evaporator or the evaporation space, in which the cooled exhaust gas, after it has flowed through a first evaporation space, is led through a heat exchanger, which is preferably designed as a plate heat exchanger, and after exiting the heat exchanger is led to a second evaporation chamber. The advantage of such a structure is that the heat exchanger or the cooler can be made smaller, since a smaller amount of heat must be removed from this cooler. In addition, the methanol can be completely evaporated due to the higher achievable temperatures of the carrier gas.

Furthermore, the exhaust gas cooler can be substantially reduced if, instead of disposing of the surplus $CO_2$ completely with the other constituents of the anode exhaust gas into a burner, only the excess $CO_2$ is removed from the anode exhaust gas with a $CO_2$ scrubber, for example with the aid of an amine scrubber. An amine scrubber is a scrubber that contains $CO_2$-absorbing amines. This amine scrubber can be regenerated with the waste heat of the fuel cell stack.

Additionally, and/or alternatively, another $CO_2$ deposition method may be used so that the water vapor contained in the anode exhaust gas is completely recovered. This reduces the need for water during the reforming and the water vapor contained therein, so that a smaller amount of water must be condensed out and thus the exhaust gas cooler can be made smaller.

The above statements on the method according to the invention apply equally to the device and vice versa. The invention will be explained in more detail below with reference to the drawings. These show in FIG. 1 a schematic representation of a HT/NT PEM fuel cell system with a condensation-evaporation device according to the invention, FIG. 2 a schematic representation of a DMFC fuel cell system with a condensation-evaporation device according to the invention, FIG. 3 a schematic representation of a further exemplary embodiment of an NT-PEM fuel cell system with a condensation-evaporation device according to the invention, and FIG. 4 a schematic representation of an exemplary embodiment of a two-part methanol pre-evaporator or evaporation chamber with an interposed exhaust gas cooler, and FIG. 5 a schematic representation of an embodiment of a condensation-evaporation device according to the invention and a $CO_2$ separator.

In the following, a condensation-evaporation device 1 according to the invention is described based on an HT-PEM fuel cell system 2 with methanol as fuel (FIG. 1).

This system 2 comprises a fuel cell stack 3 having an anode side 4 and a cathode side 5, a reforming device 6, and the condensation evaporation device 1.

The condensation/evaporation apparatus 1 comprises a condensation chamber 7 for condensing water from the water vapor contained in the cathode exhaust gas of the fuel cell stack 3 and an evaporation chamber 8 for at least partially evaporating methanol to methanol vapor. The condensation chamber 7 and the evaporation chamber 8 are thermally coupled via a heat exchanger 9 or the condensation chamber 7 and the vaporization chamber 8 are an integral part of the heat exchanger apparatus 9.

The heat exchanger apparatus 9 is designed, for example, as a plate heat transfer device. The plate heat transfer device 9 has corrugated profiled plates (not shown), which are composed such that in each successive chamber once the (to be heated) evaporation chamber and then the heat-emitting (condensation chamber) medium flows (alternately). These chambers form according to the condensation chamber 7 and the evaporation chamber 8.

The cathode side 5 of the fuel cell stack 3 has an inlet 10 for supplying cathode air. For supplying cathode air, a pump or a blower 11 may be provided.

A cathode outlet 12 is connected via a line section 13 to an inlet 14 of the condensation chamber 7 of the condensation-evaporation device 1.

In this line section 13, a pre-cooler 15 is integrated. The pre-cooler 15 may include, for example, a heat exchanger 16 and a fan 17 and a temperature sensor (not shown) to cool cathode exhaust gas.

An outlet 18 of the condensation chamber 7 is connected via a line section 20 to a media unit 19, which is designed, for example, as an evaporator or as a humidifying device.

In the line section 20, the phase separation device 21 is integrated so that the liquid phase of the media unit 19 is supplied and the gas phase is discharged from the system or can escape. In this line section 20, a pump (not shown) may be integrated to produce condensate.

An anode outlet 22 of the fuel cell stack 3 is connected via a line section 23 to an inlet 24 of the evaporation chamber 8. In this line section 23, a pump 25 is integrated.

Furthermore, a catalytic burner 26 is connected to this line section 23 to prevent a discharge of exhaust gases such as hydrogen or carbon monoxide to the environment. The oxidation takes place via a supply of air oxygen into the exhaust gas stream. The heat generated in this case can be supplied via a thermal coupling, for example, the media unit.

Furthermore, a fuel container 27 is provided, which also opens into the evaporation chamber 8 and is connected thereto via a line section 29. Between evaporation chamber 8 and fuel tank 27, a pump 28 is provided. Instead of the pump 28 a metering device (not shown) may also be provided which comprises, for example, two pumps, an intermediate reservoir or a pump with mass flow meter.

An outlet 30 of the evaporation chamber 8 is likewise connected to the media unit 19 by means of a line section 31.

The media unit is connected via a line section 32 to an anode inlet 33.

In this line section 32, the reformer device 6 is integrated. The reformer device 6 may comprise one or more series-connected reformers or shift stages.

Alternatively, the heat transfer device may also be designed as spiral heat exchangers, tube heat exchangers or tube bundle heat exchangers, U-tube heat exchangers, jacket tube heat exchangers, heating coils or cooling coils or as countercurrent layer heat exchangers.

The operation of this fuel cell system will be explained below.

In this fuel cell system, it is provided that the anode of the fuel cell stack is supplied by means of reformate directly via the reformer device 6. Furthermore, the fuel cell system 2 has a $CO_2$ cycle. $CO_2$ as a carrier gas as well as water and fuel vapor are fed to the reformer device 6 via this circuit.

In the reformer device 6, a steam reforming takes place in which hydrogen and carbon dioxide is produced from methanol and water ($CH_3OH+H_2O \rightarrow 3H_2+CO_2$), in which case water is used as the oxidant to produce hydrogen.

The condensation-evaporation device 1 is formed to recover product water from the cathode exhaust gas.

In such a fuel cell system 2, the cathode exhaust gas contains more water vapor as the reaction product of the cathode reaction than is required for the hydrogen recovery. The cooling energy of the fuel vapor amount that enters the adjusted carrier gas volume flow is still too low to cool the exhaust gas to the required temperatures, and to condense out enough water. Therefore, the pre-cooler 15 is provided.

In the media unit 19, methanol is evaporated or taken up in vapor form by a carrier gas stream and fed to the reforming device 6.

In the condensation chamber 7 of the condensation-evaporation device 1, the cathode exhaust gas is cooled by the thermal contact with the evaporation chamber 8 via the heat exchanger apparatus. In this way, water is condensed out of the water vapor contained in the cathode exhaust gas and is the system 2 again.

The separation of the condensate from the exhaust stream can be done for example in the phase separation device 21 by gravity or a pump. The condensate is then fed to the media unit 19, in which also the $CO_2$-fuel vapor stream is introduced.

If the media unit 19 is designed as a moistening device, a new equilibrium of the vapor pressures of water and fuel vapor in the carrier gas arises in the liquid phase of the moistening device, depending on the molarity of the fuel solution and temperature present there.

This means that in the case where only fuel is evaporated, water vapor is additionally taken up in the gas phase. Depending on the vapor pressure of the supplied gas, additional fuel vapor is taken up by the gas phase or condensed into the fuel solution.

The media unit 19 may also be an evaporator device in which fuel and water is completely evaporated.

In addition, in addition to the pre-cooler 15 by air, further pre-cooling may be provided, e.g. by thermal contact (by means of a heat exchanger) with a liquid medium (water, fuel or fuel solution) in the media unit 19, the pre-cooled from the fuel cell 3 gas. This heat exchanger may be formed by a plate heat exchanger or corresponding piping with cooling fins extending into the liquid.

A further exemplary embodiment of the condensation-evaporation device 1 will be described below with reference to an NT-PEM fuel cell system 2 (FIG. 1).

Unless otherwise described, this embodiment corresponds to the embodiment described above. Identical components are provided with the same reference numerals.

According to this embodiment, the reforming device 6 is multi-stage or formed with at least one shift stage.

When using a low-temperature fuel cell, there is a more complex reforming with shift stages at lower temperatures and/or selective oxidation and/or a reformer with suitable catalysts to have the lowest possible carbon monoxide (e.g. 50 ppm), or to have in addition to carbon dioxide and water vapor, no other substances in the hydrogen, if possible.

Otherwise, the inventive method is carried out analogously to the above-described HT-PEM fuel cell system.

When using a solid oxide fuel cell (SOFC), however, the reformer can be omitted or adapted to the requirements of the system.

Figure 2:
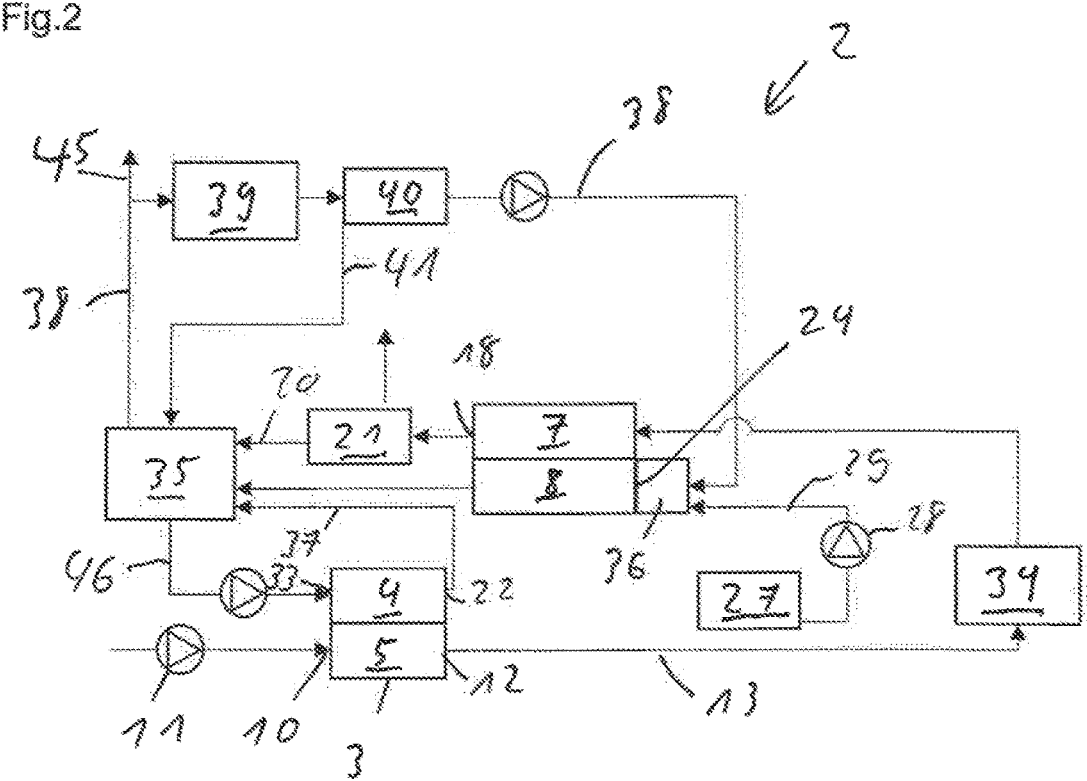

In the following, another embodiment of the condensation-evaporation device 1 will be described with reference to a DMFC fuel cell system 2 (FIG. 2).

Unless otherwise described, this embodiment corresponds to the embodiments described above. Identical components are provided with the same reference numbers.

The cathode outlet 12 of the fuel cell stack is connected via the line section 13 to the condensation chamber 7 of the condensation evaporation device 1.

In this line section 13, a heat exchanger apparatus 34 is integrated for pre-condensation.

The outlet 18 of the condensation chamber 7 is connected via the line section 20 with a special methanol solution tank 35, which serves as a buffer memory. This container 35 contains two phases, a liquid phase (methanol solution) and a gas phase (anode exhaust gas ($CO_2$)).

In the line section 20, the phase separation device 21 is integrated so that the liquid phase is supplied to the container 35 and the gas phase can escape from the system.

Fuel tank 27 is connected via the line section 29 to the inlet 24 of the evaporation chamber.

At the inlet 24 of the evaporation chamber 8, a distribution device 36 is provided for the uniform or optimal loading of the evaporation chambers with $CO_2$ and fuel, primarily in direct current. The direct current prevents excessive cooling of the carrier gas and thus its absorption capacity of fuel. The distribution device 36 can also be designed as a valve device for controlling corresponding volume flows.

For circulating the methanol solution, a line section 37 from the anode outlet 22 to the methanol solution vessel 35 is provided.

Furthermore, in this system, a further gas cycle, wherein in the gas cycle circuit anode exhaust gas is used as a carrier gas, may be provided.

In this gas cycle, a portion of the $CO_2$ resulting from the anode reaction which emerges from the fuel cell stack 3 as anode exhaust gas is recirculated.

The unneeded remainder of this gas can be removed via a gas outlet 45 which is connected to line section 38.

For recirculation, a line section 38 leads from a chamber of the methanol solution tank 35 containing the gas phase to the inlet 24 of the evaporation chamber 8.

In addition, a heat exchanger apparatus 39 and a phase separation device 40 can be integrated in this line section 38 or in the gas circuit.

The phase separation device 40 has a return line 41 to the methanol solution tank 35.

In the methanol solution tank 19, the two-phase mixture of the anode fluid flows from the anode outlet 22, the gas being separated therein and partially recirculated to the vaporization chamber of the KVV 1, for example by means of a pump.

The non-circulated part is discharged from the system via a conduit section 44. For its purification, an afterburner can be used again.

To increase the methanol uptake in the evaporation chamber 8 of the KVV 1, the $CO_2$ phase can be cooled in the heat exchanger apparatus 39 before it enters the KVV 1 to condense water vapor and methanol vapor and be deposited in the phase separation device 21.

However, the heat exchanger apparatus 39, which is, for example, air-cooled or can be cooled by thermal coupling to the condensation chamber, and the phase separation device 40 are not absolutely necessary in a DMFC fuel cell system 2. Particularly, when operating with low methanol concentrations one can do without it In order to achieve a lower methanol concentration in the carrier gas, a methanol-depleted zone in the methanol solution container 35 can also be formed. Then, the gas chamber of the container 35 is divided into an upper chamber and a lower chamber (not shown). In the upper space, the anode fluid depleted in the fuel cell 3 is introduced. In this case the methanol solution flows in the lower space with the liquid phase of the buffer storage by gravity or a conveyor. The gas phase (mainly $CO_2$) in the upper chamber is partially conveyed to the evaporation chamber 8 and the remainder is discharged from the system as anode exhaust gas (not shown).

Alternatively, carrier gas with a lower methanol vapor pressure can also be taken away via an additional phase separation in line section 37 from the anode fluid. (not shown).

In the evaporation chamber 8, there is contact between $CO_2$ with supplied methanol from a methanol $CO_2$ tank or fuel tank 27 and to its evaporation. The effluent mixture of methanol and $CO_2$ is then introduced into the methanol solution tank 35.

The methanol solution tank 35 is connected to the anode inlet 33 of the fuel cell stack 3 via a pipe section 46.

The phase separation device 40 is connected to the methanol solution container 35 via a line section 41.

Usually, DMFC systems have a buffer with a methanol solution consisting of methanol and water to supply the anode electrodes. This solution, after passing through the anode and depleted there, is returned to the storage. The storage is supplied with water and methanol or methanol solution to compensate for the depletion. In systems that are supplied exclusively with pure methanol, water must be recovered from the cathode exhaust gas. This is made possible by condensation of product water in the cathode.

In order to use the KVV 1 in DMFC fuel cell systems 2, it is necessary to provide carrier gas, that is, to provide the gas cycle described above.

In evaporation chamber 8, there is contact between $CO_2$ with supplied methanol from the fuel tank 27 and to its evaporation. The effluent mixture of methanol and $CO_2$ is then introduced into the methanol solution of the buffer tank 35. In the methanol solution (low-molar, e.g., 0.5-3 molar), the methanol mostly condenses again, releasing heat of vaporization, thereby establishing a higher temperature level within the solution, which transfers to the fuel cell through which the methanol solution flows. When the temperature of the fuel cell increases, e.g. from 70° C. to 85° C., a significant increase in performance can be expected.

The KVV 1 can also serve only to increase the operating temperature, if it can be dispensed by supplying a methanol-water mixture (for example, from the buffer tank (not shown)) on the water condensation. In this case, the cathode condensate is not supplied to the methanol solution container, but discharged, for example, with the exhaust gas. In the evaporation chamber of the KVV the methanol solution is then fed instead of pure methanol and is evaporated.

The cathode condensation is carried out as described in the first performance example.

In a gaseous supply one of the DMFC, e.g. by means of a humidification-processing device, by which vapors are delivered to the $CO_2$ phase from the methanol solution, a part of the gaseous anode fluid ($CO_2$, water, and methanol vapor) exiting from the anode compartment is led into the evaporation chamber 8 of the KVV 1.

Figure 3:
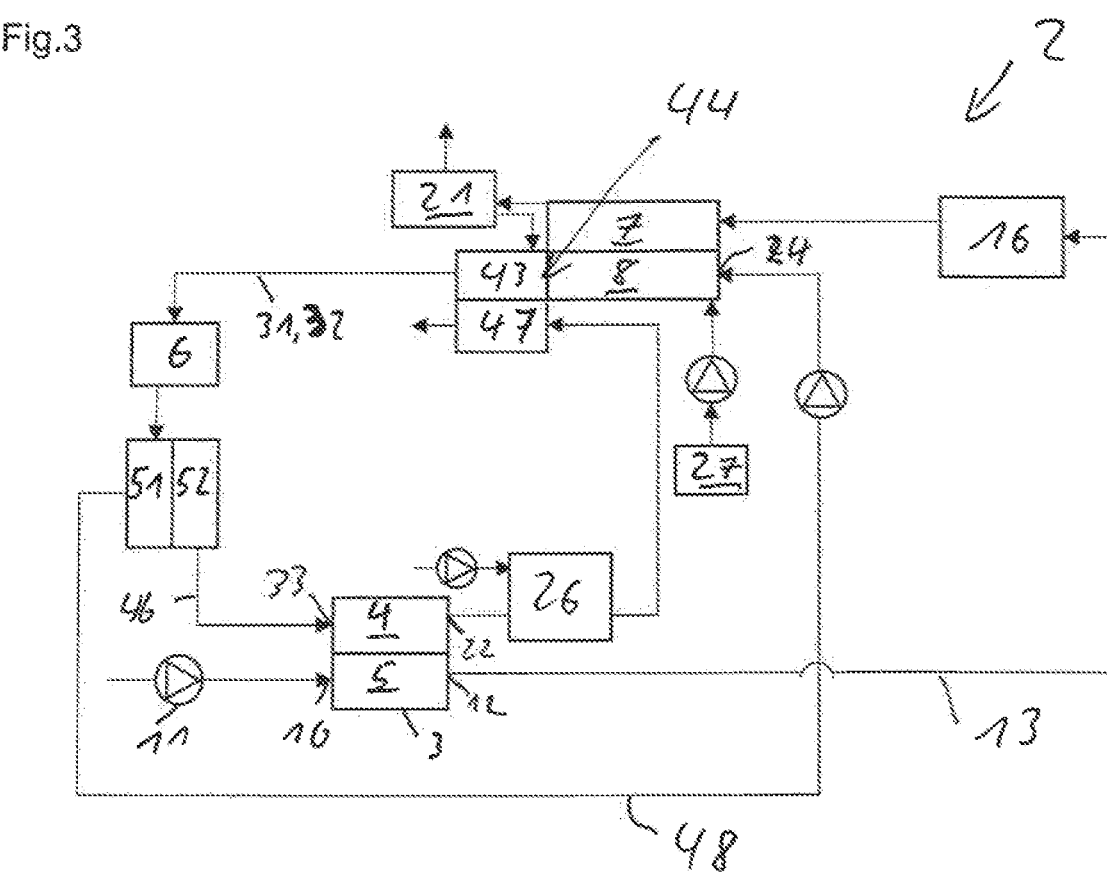

In the following, another embodiment of the condensation-evaporation device will be described with reference to another NT-PEM fuel cell system (FIG. 3).

Unless otherwise described, this embodiment corresponds to the embodiment described above. The same components have the same reference numerals.

Also, according to this embodiment, the reformer device 6 may be formed in multiple stages.

After the reformer device 6, according to this embodiment, a separator 50 (51, 52) for separating hydrogen from the reformate is provided. In this separator 50, which can be heated, the hydrogen is separated via membranes (e.g., metallic palladium/silver membranes) from the reformate. The membrane is provided between chambers 51 and 52 of the separator 50, 6. In the chamber 51, reformate flows in. In this case most of the hydrogen passes through the membrane in chamber 52 and is supplied from there to the anode inlet 33 of the fuel cell stack.

In this case, it is not that the anode off gas is used as the gas phase for receiving fuel in the evaporation space 8, but it is e.g. taken in the CO2 phase from chamber 51 after the hydrogen separation and passed over the line section 48 in the evaporation chamber 8 of the KVV 1.

Furthermore, the evaporation chamber 8 opens into a further chamber 43 for overheating, which is thermally isolated from the condensation chamber 7 and is not thermally coupled thereto. In this chamber a further energy input takes place in such a way that the fuel is completely evaporated.

Water from the phase separator 21 is supplied to the further chamber 43 from the phase separator 21, which is also preferably completely evaporated in chamber 43.

Accordingly, not only the fuel evaporated in the $CO_2$ phase fuel, but also water is evaporated.

The evaporation chamber 8 is thus extended according to the alternative embodiment shown here with the further chamber 43 for complete evaporation or overheating to a superheating device 44, in which the remaining non-evaporated liquid fuel or the fuel solution is heated above the boiling point, so that they evaporate. With this structure one can do without a media unit.

Chamber 43 may be thermally insulated from the condensation chamber by means of insulation (not shown). However, it is also possible to dispense with the insulation. The chamber is designed or arranged in such a way that the energy input into the condensation chamber is low or the cooling effect of the evaporation chamber is only slightly reduced.

Chamber 43 can be heated by a heater 47, which is for example designed as a heat exchanger, which is supplied with hot gases from the catalytic burner 26, so that a pure gaseous supply of reformer or fuel cell with the reactants is possible.

Furthermore, a fuel cell system according to the present invention, that is, according to all the embodiments described above, comprises a control device (not shown). The control device is designed to adjust the temperature in such a way that the amount of water required for the reformer or anode reaction is condensed out in the condensation-evaporation device. For this purpose, the control device controls one or more of the input described parameters and or components of the fuel cell system.

The embodiments described above can be combined with each other, even if the above possible combination options are only partially shown.

Methanol is used as fuel in the description of the present invention by way of example only. Other liquid fuels, such as other alcohols, e.g. ethanol, formic acid, gasoline, diesel, dimethyl ether, LPG can be used. In principle, especially substances with high vapor pressures (a low boiling point, for example below 85° C.) and a high enthalpy of evaporation are suited. These properties apply particularly to methanol.

For lower boiling point materials, the process can be optimized by using appropriate pressures (higher pressures in the evaporation chamber) or in case of high boiling points with lower pressures.

By the application described in this invention, product water is recovered particularly from the cathode exhaust gas. Recovery of product water from the anode exhaust gas is also possible, but not preferred. Furthermore, other gases such as reformate can be dried.

According to a further aspect of the present invention, the gas stream discharged from the phase separation device 21 can be thermally coupled to a further device of the fuel cell system 2 to temper this further device. Another device may be one or more line sections and or one or more components of the fuel cell system.

This exploits the fact that the invention enables a temperature level independent of the environment with which the fluids escape from the CVT.

This property can advantageously be used to cool or temper components or fluids at a stable temperature level.

For example, pump 25 delivering the carrier gas can be stably operated by cooling or tempering the carrier gas fluid to a predetermined temperature level by means of a heat exchanger. This is done by the fuel cell exhaust gas from the KVV flows on the cold side of a heat exchanger after the phase-separating device in countercurrent and flows on the hot side of the heat exchanger, the carrier gas. In addition, the cooled fluid can also temper or cool components such as pumps or electronics by means of a thermal contact Another effect of the present invention is to increase the operating temperature of DMFC systems and thus the power density of the fuel cell.

Instead of pure fuel, a fuel solution can also be evaporated to moisten the fuel cell or to provide the water vapor necessary for operation.

By means of the condensation according to the invention, product water which is required for operation can also be used at high outside temperatures, e.g. in hot areas. This applies to all embodiments of the present invention.

The heat exchange device requires a small space because a sufficient temperature difference across the evaporation chamber can be set (e.g., higher than the cooling air) and heat is not released into the gas but into the liquid. This is possible with much smaller areas than with gases.

If several parallel chambers are used for fuel evaporation, as for example in a plate heat exchanger, a fine distribution can be provided at the common input for fuel and gas, which distributes the gas reliably to the chambers.

This can be achieved by a distribution device 36, such as a gas distributor or distributor structure, which distributes the gas into the chambers uniformly via capillaries. The distributor structure may also be formed via a feed line which has small openings in each gas chamber.

To ensure the tiltability of the device, a hydrophilic, coarse-pored material can be introduced, which flows through the gas and then distributes it finely and prevents sloshing of the fuel during tilting movements, so that no liquid fuel can get into the media unit and fuel only in gaseous state can be fed into the media unit.

A further improvement can be achieved by hydrophilizing the surfaces used. As a result, a fuel film can form on heat exchanger surfaces and this can more efficiently absorb the heat of the exhaust gas flowing on the other side.

Other embodiments are also possible: e.g. a heat exchanger or a pipe, the cathode exhaust gas flows through (condensation side, interior) and is wetted from the outside with fuel (evaporation chamber, exterior chamber). On the outer surfaces of the heat exchanger, the carrier gas ($CO_2$ phase) flows with the help of an enclosure. This heat exchanger (condensation chamber) can also be in a container with methanol and that way be partially or completely covered with methanol, wherein the $CO_2$ phase is bubbled through methanol and thereby saturated with methanol.

In the embodiments explained above with reference to FIGS. 1 to 3, it is shown by way of example in the figures that the condensing chamber 7 and the vaporization chamber 8 of the condensation-evaporation device 1 are supplied with the corresponding media in such a way that the media are guided in direct current he follows. According to alternative embodiments, which correspond to the above embodiments in all other technical features except for the DC-current, it is preferably provided that the condensing chamber 7 and the evaporation chamber 8 of the condensation-evaporation device 1, the corresponding media are supplied in such a way that a leadership of the media takes place in the countercurrent.

According to an alternative embodiment, which otherwise corresponds to the embodiments illustrated in FIGS. 1 and 3, the condensation chamber 7 is formed at least in two parts.

Figure 4:
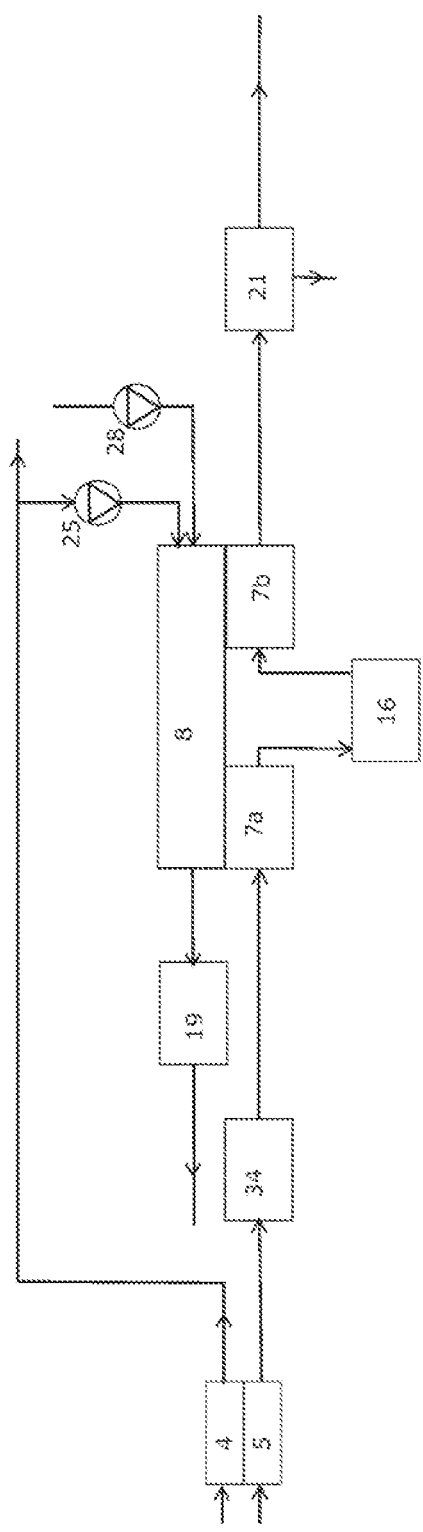
Figure 5:
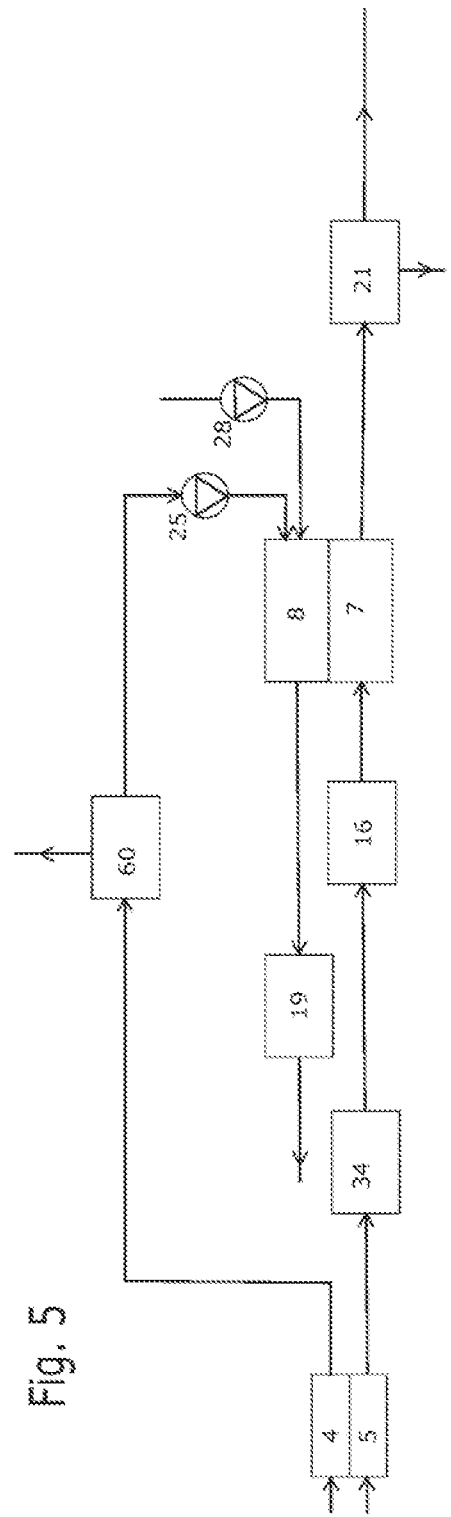

Accordingly, the condensation chamber 7 comprises a first condensation chamber 7a and a second condensation chamber 7b, which are each independently coupled to the evaporation chamber 8 thermally via the heat exchanger apparatus 9 (FIG. 4). The first and the second condensation chamber 7a, 7b and the evaporation chamber 8 may be an integral part of the heat exchanger apparatus 9.

Here, it is provided to arrange the heat exchanger 16 between the first and the second condensation chamber 7a, 7b or to switch between them.

Since the exhaust gases to be cooled require a relatively large surface of the heat exchanger 16 in order to be cooled, it is advantageous to form the condensation chamber 7a, 7b in two parts, so that the heat exchanger 16 does not have to cool the exhaust gas until after reaching the dew point. The surface of the heat exchanger 16 with the evaporating and condensing media is then significantly lower with the same performance as a heat transfer with a larger surface of the heat exchanger. With a cooling of the exhaust gas to be cooled with a smaller surface of the heat exchanger 16, the lower temperatures are compared with the methanol evaporation in an advantageously efficient manner. Otherwise, this embodiment comprises the features of the embodiments described with reference to FIG. 1 or 3.

In this case the leadership of the media takes place in countercurrent.

According to an alternative embodiment (FIG. 5), which otherwise also corresponds to the embodiments shown in FIGS. 1 and 3 and can be combined with the embodiment shown in FIG. 4, the $CO_2$ in the anode exhaust gas is depleted via a separator 60 (for example via an amine scrubber), so that the entire from the anode outlet of the anode 4 flowing over-stoichiometric, necessary for the reforming process water is recirculated via the media unit 19. As a result, the loss of water is minimized, and only the stoichiometrically consumed water must be replaced, so that in this case the heat exchanger 16 can also be made substantially smaller.

In principle, this method can also be used for more efficient dehumidifying of the refractory gas by passing reformate into the condensate chamber instead of exhaust gas. This is particularly advantageous for fuel cells that require dry reformate like the HT-PEM fuel cells.

LIST OF REFERENCE NUMBERS 1 condensation-evaporation apparatus
2 fuel cell system
3 fuel cell stack
4 anode side
5 cathode side
6 reforming apparatus
7 condensation chamber 7a first condensation chamber 7b second condensation chamber 8 evaporation space
9 heat exchanger apparatus
10 intake
11 pump
12 cathode outlet
13 line section
14
15 pre-cooler
16 heat exchanger
17 aeration system
18 outlet
19 media unit
20 line section
21 phase-separation device
22 anode outlet
23 line section
24 intake
25 pump
26 catalytic burner
27 fuel tank
28 pump
29 line section
30 outlet
31 line section
32 line section
33 anode inlet
34 heat exchanger
35 methanol solution tank/buffer
36 distribution facility
37 line section
38 line section
39 heat exchanger apparatus
40 phase-separation device
41 line section
42 shift stage
43 chamber
44 overheating device
45 line section
46 line section
47 heater
48 line section
50 separator
51 chamber
52 chamber
60 separator

The invention claimed is:

1. A method of parallel condensing and vaporizing for a fuel cell system with a condensing/vaporizing apparatus,
wherein the condensing-vaporizing apparatus (KVV) has a condensing chamber and an evaporation chamber which are thermally coupled to each other via a heat exchanger in such a way
that water vapor contained in the condensing chamber in an exhaust gas of a fuel cell stack is condensed into water and
in the evaporation chamber, a liquid fuel of a two-phase mixture comprising the liquid fuel and a gas phase, is at least partially evaporated to fuel vapor
wherein the energy required for evaporation is at least partially provided by waste heat from the exhaust gas of the fuel cell stack of a fuel cell and the associated energy withdrawal from the exhaust gas of the fuel cell stack is used for condensation,
wherein the gas phase comprises a carrier gas that is $CO_2$.
2. The method according to claim 1,
wherein the carrier gas is circulated in the fuel cell system.
3. The method according to claim 1,
wherein exhaust gas from which the water is condensed out is a cathode and/or anode exhaust gas of the fuel cell stack.

4. The method according to claim 1, wherein in the evaporation chamber, the carrier gas is brought into contact with liquid fuel in such a way that saturation of the carrier gas with fuel vapor is achieved.

5. The method according to claim 1, wherein the exhaust gas is pre-cooled before entering the condensing chamber by means of at least one cooling device.

6. The method according to claim 1, wherein an aqueous fuel solution is provided as fuel.

7. The method according to claim 1, wherein, in the evaporation chamber, the liquid fuel is heated to or above a boiling point for the liquid fuel.

8. The method according to claim 1, wherein the heat exchanger is specifically a heat exchanger apparatus, and a cooling side of the condensing chamber is adjacent to the heat exchanger apparatus and to an evaporation chamber wall.

9. The method according to claim 1, wherein the fuel cell system uses a reformer, and the reformer reaction results in products including $H_2$ and $CO_2$ from liquid fuel.

10. The method according to claim 1, wherein the fuel cell system is a system in which fuel is introduced directly into an anode compartment of the fuel cell and reacts on an anode catalyst to form $CO_2$.

\* \* \* \* \*